United States Patent
Babjak et al.

(10) Patent No.: US 6,576,205 B2
(45) Date of Patent: Jun. 10, 2003

(54) METHOD FOR REDUCING THE CRYSTALLINITY OF NICKEL HYDROXIDE POWDERS

(75) Inventors: Juraj Babjak, Mississauga (CA); Feng Zou, Mississauga (CA); Stephen Joseph Baksa, Oakville (CA); Victor Alexander Ettel, Mississauga (CA)

(73) Assignee: INCO Limited, Toronto (CA)

( * ) Notice: Subject to any disclaimer, the term of this patent is extended or adjusted under 35 U.S.C. 154(b) by 136 days.

(21) Appl. No.: 09/945,869

(22) Filed: Sep. 4, 2001

(65) Prior Publication Data

US 2003/0044345 A1 Mar. 6, 2003

(51) Int. Cl.[7] ................................................ C01G 53/00
(52) U.S. Cl. .................. 423/142; 423/144; 423/594.19; 204/157.42
(58) Field of Search ................................. 423/592, 140, 423/141, 142, 143, 144, 592.1, 594.19; 204/157.42

(56) References Cited

U.S. PATENT DOCUMENTS

| 5,545,392 A | 8/1996 | Babjak et al. | ............... 423/592 |
|---|---|---|---|
| 5,702,844 A | 12/1997 | Bernard et al. | ............. 429/223 |
| 5,788,943 A | 8/1998 | Aladjov | ...................... 423/594 |
| 5,824,283 A | * 10/1998 | Babjak et al. | ............... 423/141 |
| 5,905,003 A | 5/1999 | Young et al. | ................. 429/223 |
| 6,162,530 A | 12/2000 | Xiao et al. | ............... 428/292.1 |

FOREIGN PATENT DOCUMENTS

| EP | 0872904 | 4/1998 |
|---|---|---|
| EP | 0876998 | 11/1998 |
| JP | 6340427 | 12/1994 |
| SU | 223809 | 4/1970 |

OTHER PUBLICATIONS

F.I. Kukoz and E.M. Feigina, "Effect of Ultrasound and Other Precipitation Conditions on the Particle Size Composition of Nickel Hydroxide Precipitates," pp 1978–83, Zhurnal Pikladnoi Khimii (1969), 42(9), no month.

\* cited by examiner

*Primary Examiner*—Steven Bos
(74) *Attorney, Agent, or Firm*—Edward A. Steen

(57) ABSTRACT

A process for decreasing the crystallinity of nickel hydroxide by generating and supplying large numbers of heteronuclei into the nickel hydroxide producing reaction system. Nickel sulfate and sodium hydroxide are initially forcefully and intimately combined to form a supersaturated solution of heteronuclei. These heteronuclei are introduced into a nickel powder containing slurry wherein nickel hydroxide having a crystallinity FWHM value of greater than about 0.5° is generated.

10 Claims, 2 Drawing Sheets

METHOD FOR REDUCING THE CRYSTALLINITY OF NICKEL HYDROXIDE POWDERS

TECHNICAL FIELD

The present invention relates to the crystallinity of solid materials in general, and more particularly, to a method for reducing the crystallinity of nickel hydroxide powders precipitated from supersaturated aqueous solutions.

BACKGROUND ART

Inco Limited has developed an improved process for the direct production of nickel hydroxide by utilizing elemental nickel as the starting material. As opposed to conventional caustic precipitation methods, the elemental nickel process is environmentally friendly. See, for example, U.S. Pat. No 5,545,392 to Babjak et al.

The degree of crystallinity of certain solid materials produced by crystallization is critical. For example, the catalytic activity of some catalysts increase as their degree of crystallinity decreases. The same trend applies generally to the electrochemical activity of battery powders. Nickel hydroxide, used in power cells, is a typical example. It has been shown that the electrochemical activity of nickel hydroxide increases as its degree of crystallinity decreases. The degree of nickel hydroxide crystallinity is usually expressed in terms of "Full Width Half Maximum" (FWHM) of its x-ray defraction ("XRD") [101] peak.

When the value of FWHM increases the degree of crystallinity decreases. For example, when the FWHM of nickel hydroxide is 0.1°, its crystallinity is very high and its electrochemical activity is low (below 50% of its theoretical value). When the nickel hydroxide's FWHM is 0.9° the degree of crystallinity is low and its electrochemical activity is high (close to its theoretical value of 289 mAh/g). Some publications give the crystallinity in terms of crystallite size (C.S.) which is estimated from the FWHM value. The crystallite size is an inverse function of FWHM (e.g. FWHM of 0.47° corresponds to C.S. of about 25 nm, while FWHM of 0.95° corresponds to C.S. of approximately 10 nm).

The methodology for modifying the crystallinity of powders precipitated/crystallized from aqueous solutions has not been clearly described in the literature. It appears that among various systems studied nickel hydroxide has received the most attention in terms of its synthesis and also its electrochemical testing. However, only a few literature sources discuss the effect of the conditions applied during the hydroxide synthesis on its crystallinity.

As alluded to above, most conventional commercial methods for synthesizing nickel hydroxide involve caustic precipitation from a nickel salt solution with a base in the presence of a complexing agent. Nickel sulfate, sodium hydroxide and ammonia are usually used as a nickel salt, a base and a complexing agent respectively. It has been shown that nickel hydroxide with a low degree of crystallinity can be obtained by precipitation from such system. For example, Japanese patent JP 06-340427 to Eiji et al. describes a process for precipitating nickel hydroxide, having FWHM≧0.9°, from a nickel sulfate solution using a sodium hydroxide base in the presence of ammonia at 50° C., pH 10.4 to 11.3, reactor residence time of 6.5–9 hours and impeller power input of 0.5–1.4 kW/m$^3$. U.S. Pat. No. 5,702,844 to Bernard et al., demonstrates the precipitation of nickel hydroxide having a crystallite size generally below 10 nm and as low as 2.5 nm from a similar system at 36–50° C.

It appears that the degree of supersaturation is high in these precipitation processes and presumably that may be an explanation why the product crystallinity is low.

In most processes the high degree of supersaturation cannot be achieved easily. In such situations controlling the degree of crystallinity becomes very difficult and very limited. The process described in U.S. Pat. No. 5,545,392 to Babjak et al. above may serve as an example. In this process nickel powder is directly converted into nickel hydroxide in an aqueous ammoniacal solution using oxygen as an oxidant. Nickel is dissolved and simultaneously precipitated as hydroxide. Since the two steps, i.e. the dissolution and the precipitation cannot be controlled independently the high degree of supersaturation cannot be achieved. As a consequence altering the degree of the product crystallinity is limited with such direct conversion processes.

SUMMARY OF THE INVENTION

There is provided a process for expeditiously altering the degree of crystallinity of nickel hydroxide where the concentration of the nickel hydroxide is precipitated/crystallized at a relatively low level of supersaturation. By generating and force feeding a large number of heteronuclei into the reaction system which by itself is incapable of generating the desired number of nuclei, the crystallinity of the resultant nickel hydroxide is dramatically reduced.

PREFERRED EMBODIMENT OF THE INVENTION

Attempts were made to decrease the crystallinity of the nickel hydroxide produced according to the direct process similar to that described in the above referenced U.S. Pat. No. 5,545,392 to Babjak et al. by varying the operating pH, temperature, solution composition and global reaction rate. However, the degree of crystallinity was reduced within a rather narrow range which was considered to be inadequate. However, it was then determined that by forcing nucleation, that is by generating and increasing supplying the nuclei to the reaction system the degree of the product crystallinity was reduced very dramatically, as is shown in the following examples.

The term "about" before a series of values, unless otherwise indicated, shall be interpreted as applying to each value in the series.

EXAMPLE 1

Operation Without Forced Nucleation

A 10 liter reactor, equipped with an agitator, a pH electrode, a calomel redox electrode, an oxygen sparger and a temperature controller was operated continuously. An activated nickel powder slurry, containing approximately 400 g Ni$^0$/L of a recycled solution, which contained approximately 0.5 mole/L of ammonia and 1 mole/L of sodium sulfate was fed continuously into the reactor at specific rates, varying from 0.6 to 1.8 g Ni$^0$ per liter of reactor volume per minute. The nickel powder used was a commercially available actuated powder (S—Ni™ powder supplied by Inco Special Products—Wyckoff, N.J., USA and made by Inco Limited's nickel carbonyl decomposition process). Oxygen was supplied to the reactor via the sparger on demand to maintain a redox potential of about—400 mV with respect to the calomel electrode. A small stream of 6 M sodium hydroxide solution was also added to the reaction slurry on demand to maintain the desired pH. Several runs were conducted at different:

pH values in the range from about 9.7 to 11.4, temperatures, varying from about 20 to 60° C., and feed nickel powder rates, varying from about 0.6 to 1.8 g/minute/(liter of reactor volume).

Samples of the produced nickel hydroxide were collected for the different operating conditions and subjected to XRD analysis to determine FWHM values of [101] peak. Within the above conditions the general physical and chemical characteristics of the $Ni(OH)_2$ were satisfactory. However, FWHM varied from 0.3 to 0.5°. Hence the reduction of the degree of crystallinity in the absence of forced nucleation was inadequate.

EXAMPLE 2

Operation with Forced Nucleation (External Nucleation)

Figure 1:
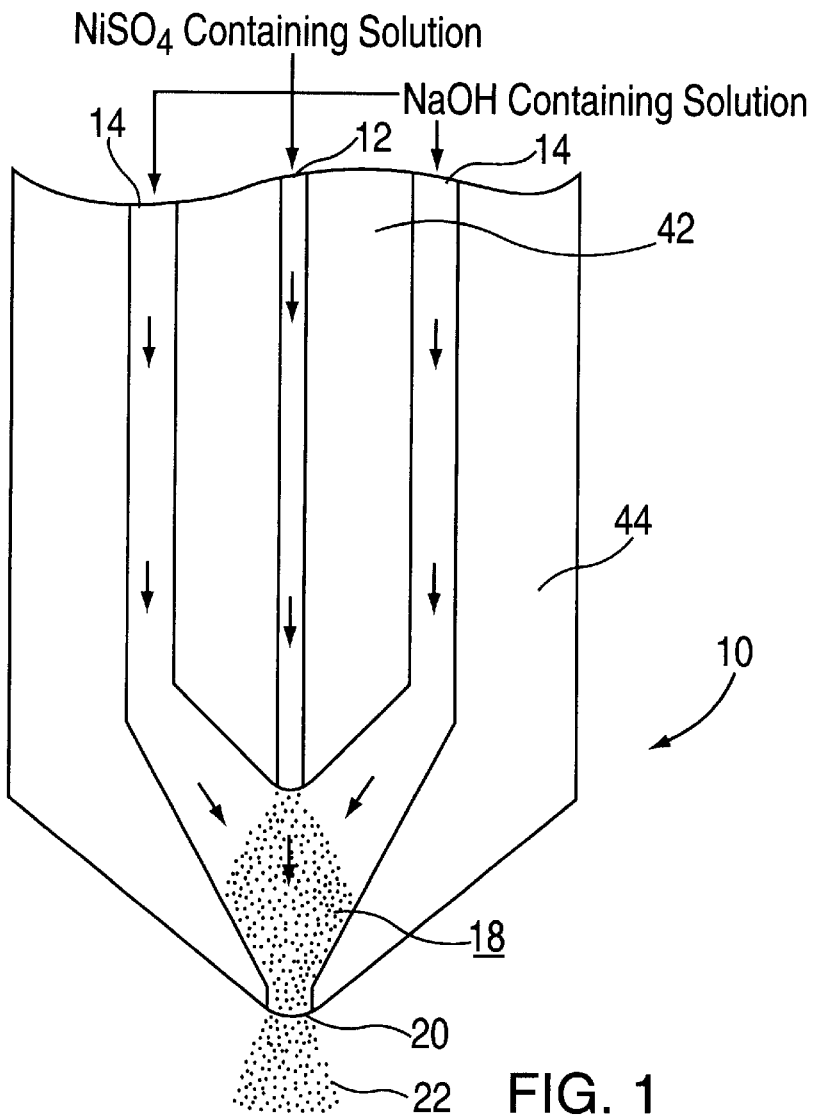
FIG. 1 is a cross sectional view of an embodiment of the invention.

A) Turning now to FIG. 1, the nuclei were generated in a concentric tube nucleator 10. Solution streams of $NiSO_4$ and NaOH were force fed through capillaries 12 and 14 formed in glass body 16. The capillaries 12 and 14 (only these are pictured but additional capillaries may be used) join together in mixing zone 18 wherein nuclei stream 22 emerges from nozzle 20.

The concentric tube nucleator 10 was made from two glass tubes 42 and 46 having different sizes. The smaller tube 42 including capillary 12 for $NiSO_4$ solution passing was located inside the larger tube 44 used for passing NaOH solution to create the capillaries 14. The two solutions were mixed within the mixing zone 18. The capillary 12 was about 0.5 mm. The capillary 14 was about 2 mm in diameter and the nozzle 22 was about 5 mm in diameter.

The nucleator 10 was disposed two centimeters above the level of the solution in the reactor vessel described in Example 1 (not shown). The nuclei stream 22 was directly injected into the solution taking care as to eliminate splashing by covering the vessel. The contents of the reactor and the various runs were the same as described in Example 1.

By combining and rapidly mixing the streams of $NiSO_4$ and NaOH in a forceful manner, the compositions are nucleated externally without the vessel in the reactor 10. The combined mixing residence time in the nucleator 10 was less than one second. The combined nuclei stream 22 appeared to be free of any precipitate. However, it became cloudy almost instantly when collected in a test tube.

The flow rate of the NaOH solution was about 5–45 ml/minute. The flow rate of the $NiSO_4$ solution was about 0.3–8 ml/minute.

Using the nucleator 10, FWHM of the nickel hydroxide was improved from 0.4 to 0.6° at the above specified conditions when a relatively small amount of nickel sulfate (corresponding to approximately 8% of the total nickel in the nickel hydroxide product) was added on a continuous basis. Several other nucleator types (not shown) stationed above the solution gave similar improvements in FWHM.

Figure 2:
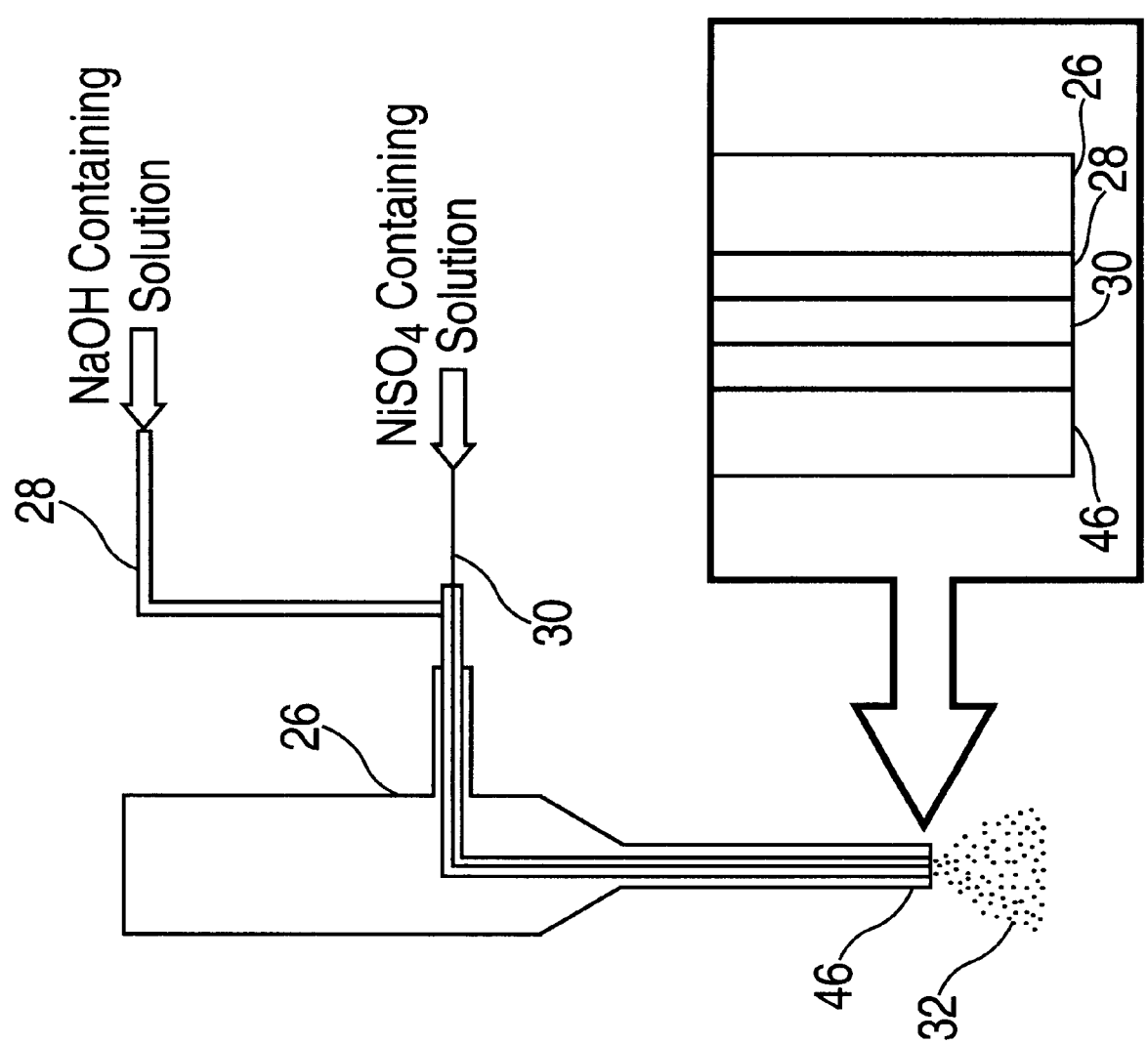
FIG. 2 is a cross sectional view of an embodiment of the invention.

B) Improved results were achieved using an ultrasonically assisted nucleator 24. See FIG. 2. Consisting of a ultrasonic probe 26, a stream of NaOH solution was fed through a tube 28 where it was mixed and combined with a $NiSO_4$ containing solution fed through a thin Teflon® tube 30 encased in titanium. The combined streams were pulsed by the probe 26 to form a high powered spray 32 that was introduced above the surface of solution in into the reactor. NaOH solution passes through the ultrasonic probe 26 and mixes with $NiSO_4$ solution at the tip 46 of the probe 26.

FWHM of the nickel hydroxide was improved from 0.4° to 0.64° at 8% $NiSO_4$ addition; to 0.76° at 15% of $NiSO_4$ addition; and to 0.95° at ~20% of $NiSO_4$ addition.

The Homogenizer™ series 4710, 600 watt ultrasonic probe 26 was manufactured by Sonics and Materials Inc., of Newton, Conn., U.S.A.

EXAMPLE 3

Operation with Forced Nucleation Performed In-Situ

Figure 3:
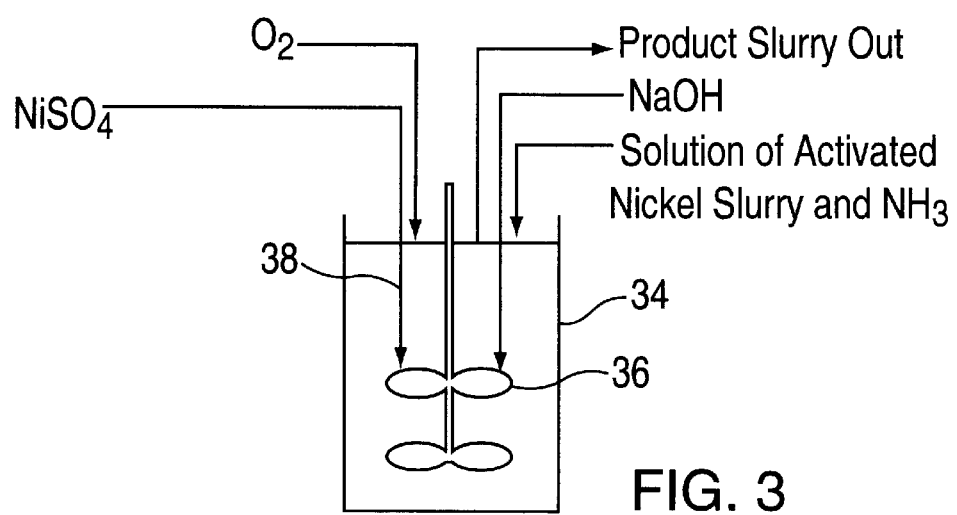
FIG. 3 is a miniplant reactor.

Turning now to FIG. 3. The reactor 34 of Example 3 was operated under the various conditions similar to those described in Examples 1 and 2. (Ni powder addition rate of 0.7 g/min/L of reaction volume, pH of 11.3 at 60° C. and redox-potential of—400 mV). However, a small stream of approximately 2 M nickel sulfate solution was introduced in the form of a jet 38 directly into the solution within the reactor 34 in the vicinity of the impeller 36. Also an equivalent amount of sodium hydroxide solution (ca. 6 M) was introduced into the reaction slurry via jet 40 into the vicinity of the impeller 36. The flow rate of NaOH solution was about 5–45 ml/minute while the rate of $NiSO_4$ solution was about 0.3–8 ml/minute. The amount of nickel sulfate introduced into the reactor corresponded to approximately 20% of the total nickel content in the nickel hydroxide product. FWHM of the produced hydroxide was 0.9°.

In principle, the ultrasonic nucleator 24 is similar to the concentric tube nucleator 10 but introducing ultrasonic energy appears to engender better mixing and avoids plugging at the tip 46 of the probe 26.

Although not wishing to be bound by any technical supposition, it appears that by forcibly mixing and agitating the nickel sulfate and nickel hydroxide solution streams, the physical shearing and colliding actions cause forced nucleation of these components which leads to reduced crystallinity the resulting powder. Generally, during crystallization, there are two kinds in nucleation, heterogeneous and homogeneous. For a very low supersaturated condition, heterogeneous nucleation may predominate the nucleation process, in which the number of nuclei depend very much on the amount of heteronuclei that can be any small particles in the solution. In the case of high supersaturation, the number of nuclei depend on the degree of supersaturation, i.e. higher supersaturation—more nuclei are produced. In order to reduce the crystallinity, generating more nuclei is normally required.

Applying the heterogeneous nucleation concept to a limited supersaturation condition is the basis of the present process. However, the heteronuclei introduced here are the same material as the final product—$Ni(OH)_2$. When high concentrated $NiSO_4$ solution mixes with NaOH solution in the nucleator 10, ultrasonic nucleator 26 or at the impeller 36 which all can be considered a very high supersaturation condition, a large number of $Ni(OH)_2$ nuclei may be generated by the following reaction:

In order to avoid an undesirable decrease in nucleation efficiency from nuclei agglomeration and recrystallization, relatively violent mixing and fast introduction are necessary.

Although ultrasonic energy is suggested for the conventional production of nickel hydroxide, that is, the precipitation of NiOH from a salt solution, there is no recognition of crystallinity concerns. See, for example, U.S. Pat. Nos. 5,702,844 to Bernard et al. and 5,788,943 to Aladjou. In contrast, production of nickel hydroxide directly from a nickel powder, as is practiced by applicant-assignee, requires recognition that crystallinity can be favorably adjusted in an efficient and effective manner.

It appears that a key to the process is the forced nucleation of the nickel sulfate and sodium hydroxide either externally or internally.

Moreover, it appears that the present crystallinity reduction process need not be limited to the production of pure nickel hydroxide. Any similar direct production of oxide from the elemental starting powder is believed possible. The addition of additional components into the hydroxide may be carried out simultaneously.

For example, nickel hydroxide with cobalt hydroxide additives is especially useful for battery cell applications. Accordingly, cobalt sulfate may be concomitantly added to the reactor 34 to enhance the properties of the resultant nickel hydroxide.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for reducing the crystallinity of nickel hydroxide, the process comprising:
    a) providing a slurry including ammonia, sodium sulfate, oxygen and nickel powder;
    b) forcefully combining solution streams containing nickel sulfate and sodium hydroxide intimately together to form a supersaturated solution of heteronuclei;
    c) introducing the supersaturated solution of heteronuclei to the slurry; and
    d) forming a nickel hydroxide product in the slurry having a FWHM of greater than about 0.5°.

2. The process according to claim 1 wherein the solution streams of nickel sulfate and sodium hydroxide are introduced into a nucleator, forcefully mixing both solution streams in the nucleator to form the supersaturated solution of heteronuclei, and ejecting the supersaturated solution into the slurry.

3. The process according to claim 2 including introducing the solution streams of nickel sulfate and sodium hydroxide into a concentric tube nucleator.

4. The process according to claim 2 including introducing the solution streams of nickel sulfate and sodium hydroxide into an ultrasonic tube nucleator.

5. The process according to claim 1 wherein an impeller stirs the slurry and at least one of the solution streams of nickel sulfate and sodium hydroxide is directly injected into the slurry in the vicinity of the impeller.

6. The process according to claim 1 wherein the nickel powder is produced by nickel carbonyl decomposition.

7. The process according to claim 1 wherein cobalt hydroxide is introduced to the slurry.

8. The process according to claim 1 wherein the supersaturated solution of heteronuclei is formed externally of the slurry.

9. The process according to claim 1 wherein the supersaturated solution of heteronuclei is formed in-situ the slurry.

10. The process according to claim 1 including forcefully nucleating the solution streams of nickel sulfate and sodium hydroxide.

\* \* \* \* \*